United States Patent
Han et al.

(10) Patent No.: US 11,494,152 B2
(45) Date of Patent: Nov. 8, 2022

(54) METHOD, DEVICE AND SYSTEM FOR CONFIGURING DISPLAY SCREEN

(71) Applicant: XI'AN NOVASTAR TECH CO., LTD., Shaanxi (CN)

(72) Inventors: Dan Han, Shaanxi (CN); Huorong Wang, Shaanxi (CN); Jingguo Zong, Shaanxi (CN); Jiankun Li, Shaanxi (CN)

(73) Assignee: XI'AN NOVASTAR TECH CO., LTD., Shaanxi (CN)

( * ) Notice: Subject to any disclaimer, the term of this patent is extended or adjusted under 35 U.S.C. 154(b) by 0 days.

(21) Appl. No.: 17/043,726

(22) PCT Filed: Mar. 13, 2019

(86) PCT No.: PCT/CN2019/078005
§ 371 (c)(1),
(2) Date: Sep. 30, 2020

(87) PCT Pub. No.: WO2020/181529
PCT Pub. Date: Sep. 17, 2020

(65) Prior Publication Data
US 2021/0397398 A1    Dec. 23, 2021

(51) Int. Cl.
*G06F 3/14* (2006.01)
*H04W 76/10* (2018.01)
(Continued)

(52) U.S. Cl.
CPC .......... *G06F 3/1446* (2013.01); *G06F 3/0482* (2013.01); *H04W 76/10* (2018.02); *G09F 9/33* (2013.01)

(58) Field of Classification Search
CPC .... G06F 3/1446; G06F 3/0482; H04W 76/10; G09G 9/33
See application file for complete search history.

(56) References Cited

U.S. PATENT DOCUMENTS

| 6,191,758 B1 * | 2/2001 | Lee | ........................ G06F 3/1423 345/2.2 |
| 10,545,715 B2 * | 1/2020 | Guo | ........................ G06F 3/1431 |

(Continued)

FOREIGN PATENT DOCUMENTS

| CN | 105657859 A | 6/2016 |
| CN | 106598524 A | 4/2017 |

(Continued)

*Primary Examiner* — Ariel A Balaoing
(74) *Attorney, Agent, or Firm* — Yu Gang (57) ABSTRACT

Provided are a method device (20, 70) and system (30, 40, 80) for configuring a display screen, for example, the method includes that a network connection request including initial display screen information is sent in a wireless manner after power-on self-test, a network connection is established with a main console (301, 801), the initial display screen information is acquired, the initial display screen information is displayed, the updating operation to position information in the initial display screen information is carried out by the main console (301, 801) to obtain target display screen information, and a coordinate assignment of the target display screen information is displayed to obtain display coordinate information (S61); the target display screen information and the display coordinate information are received, the position information is updated, and identification codes in the display coordinate information are associated with the initial display screen information, and is stored locally (S62).

9 Claims, 6 Drawing Sheets

(51) Int. Cl.
*G06F 3/0482* (2013.01)
*G09F 9/33* (2006.01)

(56) References Cited

U.S. PATENT DOCUMENTS

| | | | | |
|---|---|---|---|---|
| 2003/0189529 A1* | 10/2003 | Martinez | ............... | G06F 3/0481 345/1.3 |
| 2005/0168399 A1* | 8/2005 | Palmquist | ............. | G06F 1/1601 345/1.1 |
| 2005/0225669 A1* | 10/2005 | Tsai | ..................... | H04N 9/3147 345/1.3 |
| 2006/0170763 A1 | 8/2006 | Kawamura et al. | | |
| 2010/0045594 A1* | 2/2010 | Jenks | ....................... | H04N 9/12 345/1.3 |
| 2010/0123732 A1* | 5/2010 | Jenks | ....................... | H04N 9/12 345/592 |
| 2011/0047489 A1* | 2/2011 | Orr | ........................ | G06F 3/0482 715/764 |
| 2011/0164065 A1* | 7/2011 | Mate | ..................... | G06F 3/1446 345/1.3 |
| 2014/0082474 A1* | 3/2014 | Nordback | ............. | G06F 40/103 715/252 |
| 2014/0368512 A1* | 12/2014 | Kim | ...................... | G06F 3/1446 345/474 |
| 2016/0275835 A1* | 9/2016 | Yuan | ....................... | G09F 13/22 |
| 2017/0180758 A1* | 6/2017 | Somayazulu | ........ | H04N 19/174 |
| 2018/0090054 A1* | 3/2018 | Zhang | .................. | G09G 3/2096 |
| 2020/0037011 A1* | 1/2020 | Zong | ..................... | G06F 3/1446 |
| 2020/0225903 A1* | 7/2020 | Cohen | ....................... | G09G 5/12 |

FOREIGN PATENT DOCUMENTS

| | | |
|---|---|---|
| CN | 109002269 A | 12/2018 |
| CN | 109147651 A | 1/2019 |
| CN | 109427272 A | 3/2019 |

* cited by examiner

| SN1,xx-xxx-xxx | SN2,xx-xxx-xxx | SN3,xx-xxx-xxx | ...... | SNn,xx-xxx-xxx |
|---|---|---|---|---|
| SN(n+1),xx-xxx-xxx | SN(n+2),xx-xxx-xxx | SN(n+3),xx-xxx-xxx | ...... | SN(n+n),xx-xxx-xxx |
| ...... | ...... | ...... | ...... | ...... |
| SN(m+1),xx-xxx-xxx | SN(m+2),xx-xxx-xxx | SN(m+3),xx-xxx-xxx | | SN(m+n),xx-xxx-xxx |

After power-on self-test, a network connection request comprising the initial display screen information is sent in a wireless manner to establish a network connection with the main console, wherein the main console is configured to acquire the initial display screen information, display the initial display screen information, update the position information in the initial display screen information to obtain the target display screen information, and perform display the coordinate assignment on the target display screen information to obtain the display coordinate information — S61

The target display screen information and the display coordinate information are received, the position information is updated, and the display coordinate information is associated with the identification code in the initial display screen information and is stored locally — S62

After associating the display coordinate information with the identification code in the initial display screen information and storing locally, the locally stored program content is intercepted and played by using the display coordinate information — S63

METHOD, DEVICE AND SYSTEM FOR CONFIGURING DISPLAY SCREEN

TECHNICAL FIELD

The present disclosure relates to the technical field of display configuration, and particularly relates to a method, device and system for configuring a display screen.

BACKGROUND

For a large-scale sports game, the way to install the display screen in each auditorium appears gradually; and for all the display screens on the seats of a venue, if all display screens are required to display normally, these display screens are required to be marked according to display coordinates, and the marking is carried out by connecting the display screen in a wired manner in the related technology; if all display screens in the venue are connected in such manner, the erection is very difficult, a lot of wires are laid in the auditorium, so the audience is not convenient to move around.

SUMMARY

The present disclosure proposes a configuration method for a display screen, a configuration device for the display screen and a configuration system for the display screen to solve the deficiencies of the above related technology.

According to the first aspect of the present disclosure, a method for configuring a display screen is provided, and the method includes: acquiring a plurality of display screen information corresponding to a plurality of display screens, wherein each of the plurality of display screen information includes an identification code and initial position coordinate information; displaying the plurality of display screen information; updating the initial position coordinate information in the displayed, plurality of display screen information to obtain a plurality of updated display screen information corresponding to the plurality of display screens, wherein each, of the plurality of updated display screen information includes the identification code and the target position coordinate information corresponding to the identification code; ranking the plurality of updated display screen information according to the target position coordinate information in the plurality of updated display screen information; respectively performing display coordinate assignments on the plurality of updated display screen information after ranking, so as to obtain a plurality of display coordinate information corresponding to the plurality of updated display screen information, and sending the plurality of updated display screen information and the plurality of display coordinate information corresponding to the plurality of updated display screen information to the plurality of display screens.

In a possible implementation of the first aspect of the preset disclosure, the step of displaying the plurality of display screen information includes the step of displaying the plurality of display screen information in a list manner.

In a possible implementation of the first aspect of the preset disclosure, the step of updating the initial position coordinate information in the displayed plurality of display screen information to obtain a plurality of updated display screen information corresponding to the plurality of display screens includes the steps: selecting the plurality of display screen information one by one, and sending an instruction to a display screen corresponding to a selected display screen information to control a display state of the display screen, so as to obtain physical position information of the display screen; and in response to the physical position information input by a user, updating initial position coordinate information in the selected display screen information to obtain the updated display screen information corresponding to the display screen.

In a possible implementation of the first aspect of the preset disclosure, the step of sending the plurality of updated display screen information and the plurality of display coordinate information corresponding to the plurality of updated display screen information to the plurality of display screens includes the step of sending one by one, the updated display screen information and the display coordinate information corresponding to the updated display screen information according to the identification codes in the plurality of updated display screen information.

According to the second aspect of the present disclosure, a device for configuring a display screen is provided, and the device includes an information acquiring component, configured to acquire a plurality of display screen information corresponding to a plurality of display screens, wherein each of the plurality of display screen information includes an identification code and initial position coordinate information; an information displaying component, configured to display the plurality of display screen information; an information updating component, configured to update the initial position coordinate information in the displayed plurality of display screen information to obtain a plurality of updated display screen information corresponding to the plurality of display screens, wherein each of the plurality of updated display screen information includes the identification code and target position coordinate information corresponding to the identification code; an information ranking component, configured to rank the plurality of updated display screen information according to the target position coordinate information in the plurality of updated display screen information; a information assignment component, configured to respectively perform display the coordinate assignments on the plurality of updated display screen information after ranking, so as to obtain a plurality of display coordinate information corresponding to the plurality of updated display screen information, and an information sending component, configured to send the plurality of updated display screen information and the plurality of display coordinate information corresponding to the plurality of updated display screen information to the plurality of display screens.

In a possible implementation of the second aspect of the preset disclosure, the information displaying component is configured to display the plurality of display screen information in a list manner.

In a possible implementation of the second aspect of the preset disclosure, the information updating component includes a selection controlling element, configured to select the plurality of display screen information one by one, and send an instruction to a display screen corresponding to a selected display screen information to control a display state of the display screen, so as to obtain a physical position information of the display screen; and a response updating element, configured to in response to the physical position information input by a user, update initial position coordinate information in the selected display screen information to obtain the updated display screen information corresponding to the display screen.

In a possible implementation of the second aspect of the preset disclosure, the information sending component is configured to send one by one, the updated display screen information and the display coordinate information corresponding to the updated display screen information according to identification codes in the plurality of updated display screen information.

According to the third aspect of the present disclosure, a system for configuring a display screen is proposed, and the system includes a plurality of display screens, a main console, configured to: acquire a plurality of display screen information corresponding to the plurality of display screens in a wireless manner, wherein each of plurality of the display screen information includes an identification code and the initial position coordinate information; display the plurality of display screen information; update the initial position coordinate information in the displayed plurality of display screen information to obtain a plurality of updated display screen information corresponding to the plurality of display screens, wherein each of the plurality of updated display screen information includes the identification code and the target position coordinate information corresponding to the identification code; rank the plurality of updated display screen information according to the target position coordinate information in the plurality of updated display screen information; respectively perform display the coordinate assignments on the plurality of updated display screen information after ranking, so as to obtain a plurality of display coordinate information corresponding to the plurality of updated display screen information, and send the plurality of updated display screen information and the plurality of display coordinate information corresponding to the plurality of updated display screen information to the plurality of display screens.

According to the fourth aspect of the preset disclosure, a system for configuring a display screen is provided, the system includes a memory and at least one processor connected with the memory, a computer program is stored in the memory, and the at least one processor is configured to execute the computer program to realize the method described in any one of the above.

According to the fifth aspect of the preset disclosure, a method for configuring a display screen is provided, the method includes: after power-on self-test, sending a network connection request including initial display screen information in a wireless manner to establish a network connection with a main console, wherein the main console is configured to acquire the initial display screen information, display the initial display screen information, update position information in the initial display screen information to obtain target display screen information, and perform display the coordinate assignment on the target display screen information to obtain display coordinate information; and receiving the target display screen information and the display coordinate information, updating the position information, and associating the display coordinate information with the identification code in the initial display screen information and storing locally.

In a possible implementation of the fifth aspect of the preset disclosure, the above method further includes the step of: intercepting and playing locally stored program content by using the display coordinate information after associating the display coordinate information with the identification code in the initial display screen information and storing locally.

According to the sixth aspect of the preset disclosure, a device for configuring a display screen is provided, the device includes a request connecting component, configured to send a network connection request including initial display screen information in a wireless manner after-power on self-test so as to establish a network connection with a main console, wherein the main console is configured to acquire the initial display screen information, display the initial display screen information, update position information in the initial display screen information to obtain target display screen information, and perform display coordinate assignment on the target display screen information to obtain display coordinate information; and a receiving and updating component, configured to receive the target display screen information and the display coordinate information, update the position information, and associate the display coordinate information with the identification code in the initial display screen information and store locally.

In a possible implementation of the sixth aspect of the preset disclosure, the above device further includes an intercepting and playing component, configured to intercept and play locally stored program content by using the display coordinate information after associating the display coordinate information with the identification code in the initial display screen information and storing locally.

According to the seventh aspect of the preset disclosure, a system for configuring a display screen is provided, the system includes: a main console; a plurality of display screens, wherein each of the plurality of display screens is configured to: send a network connection request including display screen information in a wireless manner after power-on self-test to establish a network connection with the main console, wherein the main console is configured to acquire the display screen information, display the display screen information, update position information in the display screen information to obtain target display screen information and perform display coordinate assignment on the target display screen information to obtain display coordinate information; receive the target display screen information and the display coordinate information, update the position information, associate the display coordinate information with the identification code in the display screen information and store locally; and intercept and play locally stored program content by using the display coordinate information after associating the display coordinate information with the identification code in the display screen information and storing locally.

According to the eighth aspect of the preset disclosure, a computer readable medium is provided, the computer readable medium stores a program code, and the program code includes an instruction for executing any of the methods described above.

The above technical features of the present disclosure can have at least one following beneficial effect: a method for connecting a plurality of display screens in a wireless manner for configuration is provided, the preset disclosure field of the display screen is expanded, and the operation is more convenient, a plurality of display screens may be configured simultaneously, the efficiency for configuring the plurality of display screens is improved; the existing difficulty of connecting a plurality of display screens in a wired manner for configuration and erection is avoided, the presence, of many wires in the auditorium is avoided, which is inconvenient for the audience to move around, the influence of the wire on the audience is reduced; and the real-time interaction between the live stage and the auditorium is realized, and the performance effect is enhanced.

BRIEF DESCRIPTION OF THE DRAWINGS

For a better understanding of the preset disclosure, accompanying drawings described hereinafter are provided to constitute one part of the preset disclosure; the schematic embodiments of the preset disclosure and the description thereof are used to illustrate the preset disclosure but to limit the preset disclosure improperly. In the accompanying drawings.

DESCRIPTION OF DRAWING SIGNS

S11-S16, S131-S132: steps of the method for configuring the display screen;
20: device for configuring the display screen; 201: information acquiring component; 202: information displaying component; 203: information updating component; 204: information ranking component; 205: information assignment component; 206: information sending component; 2031: selection controlling element; 2032: response updating element;
30: system for configuring the display screen; 301: main console; 302: a plurality of display screens;
40: system for configuring the display screen; 401: memory; 402: processor;
S61-S63: method for configuring the display screen;
70: device for configuring the display screen; 701: request connecting component; 702: receiving and updating component; 703: intercepting and playing component;
80: system for configuring the display screen; 801: main console; 802: a plurality of display screens;
90: computer readable medium.

DETAILED DESCRIPTION OF THE EMBODIMENTS

It should be noted that the embodiments in the present disclosure and the features of the embodiments can be combined with each other if no conflict is caused. The preset disclosure will be described below with reference to the drawing and in conjunction with embodiments.

In order to enable those ordinary skilled in the art to understand the technical solution of the preset disclosure well, the technical solution will be described clearly and completely in conjunction with the drawings in the embodiments of the preset disclosure, and obviously, the described implementations are only a part of the embodiments of the present disclosure, not all embodiments. Based on the embodiment in the preset disclosure, all other embodiments obtained by those skilled in the art without creative efforts are included within the scope of protection of the preset disclosure.

It should be noted that the terms "first" and "second" in the specification, claims and the above drawings of the preset disclosure are used, for distinguishing similar objects, and are not necessarily used for describing a specific order or a precedence order. It should be understood that the terms used in this way can be interchanged under appropriate circumstances, so that the embodiments of the preset disclosure described herein can be implemented in an order other than those illustrated or described herein. In addition, the terms "including" and "having" and any of their variations are intended to cover non-exclusive inclusions. For example, a process, method, system, product or equipment that includes a series of steps or units is not necessarily limited to list those steps or units clearly, and may include other steps or units that are not clearly listed or inherent to the process, method, product, or equipment.

It should be noted that the term "and/or" in this text is only an association relationship describing the associated objects, indicating that there can be three types of relationships, for example, A and/or B can mean that A exists alone, A and B exist simultaneously and B exists alone. In addition, the character "/" in this text generally indicates that the front and back associated objects are in an "or" relationship.

It should also be noted that the division of a plurality of embodiments in the present disclosure is only for the convenience of description and should not constitute a special limitation. The features in each embodiment can be combined and cited mutually without contradiction.

Embodiment 1

Figure 1:
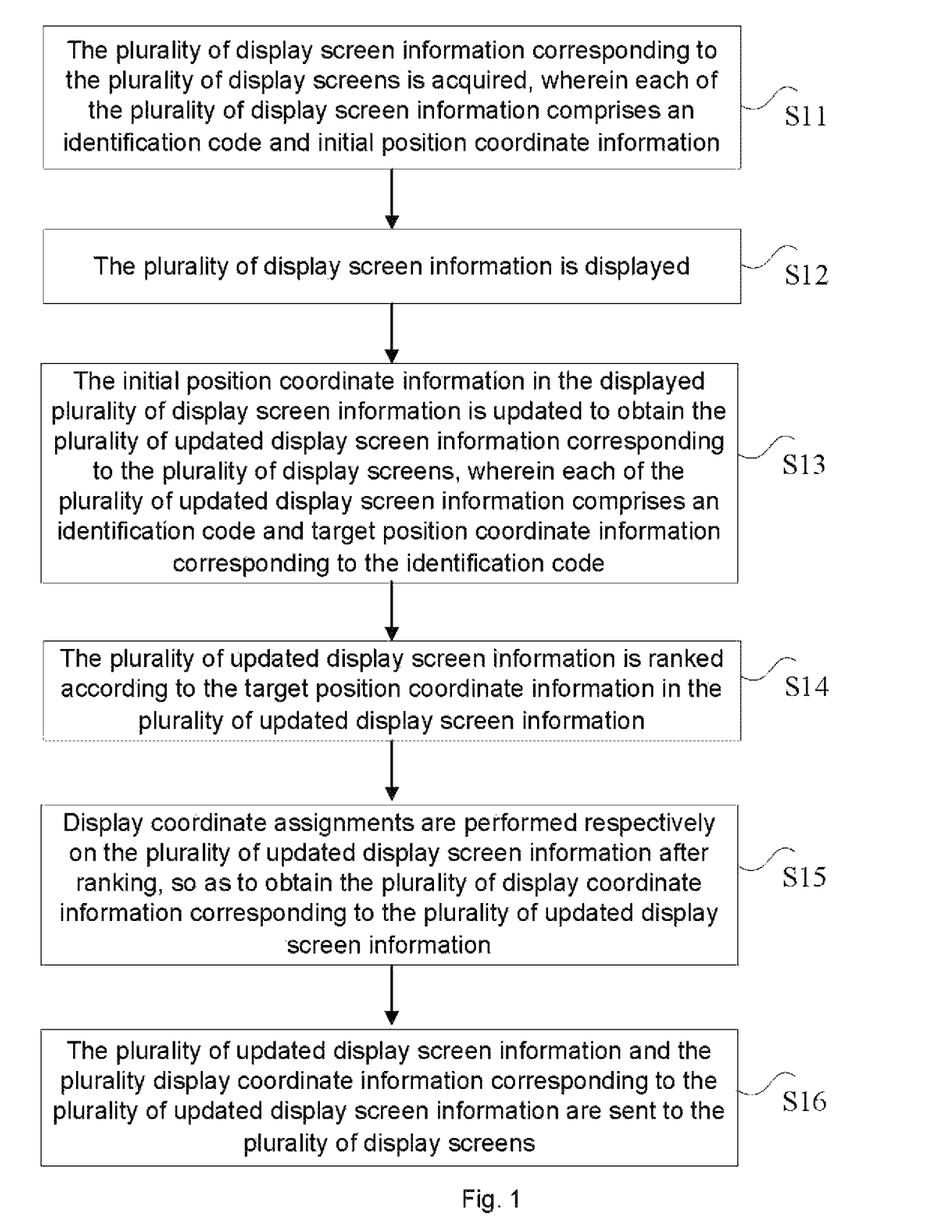
FIG. 1 is a flowchart of the method for configuring the display screen provided by the first, embodiment of the preset disclosure.

Referring to FIG. 1, the first embodiment of the preset disclosure proposes a method for configuring a display screen. As shown in FIG. 1, the method for configuring the display screen proposed in the first embodiment of the preset disclosure includes, for example, steps S11-S16:

Step S11: a plurality of display screen information corresponding to a plurality of display screens is acquired, wherein each of the plurality of display screen information includes an identification code and initial position coordinate information;

Step S12: the plurality of display screen information is displayed;

Step S13: the initial position coordinate information in the displayed plurality of display screen information is updated to obtain a plurality of updated display screen information corresponding to the plurality of display screens, wherein each of the plurality of updated display screen information includes the identification code and the target position coordinate information corresponding to the identification code;

Step S14: the plurality of updated display screen information is ranked according to the target position coordinate information in the plurality of updated display screen information;

Step S15: display coordinate assignments are performed on the plurality of updated display screen information after ranking respectively, so as to obtain the plurality of display coordinate information corresponding to the plurality of updated display screen information; and Step S16: the plurality of updated display screen information and the plurality display coordinate information corresponding to the plurality of updated display screen information are sent to the plurality of display screens.

As at least one alternative embodiment, in step S11, the mentioned display screen is, for example, a control card and an LED display screen body connecting to the control card. For example, the mentioned LED display screen body includes 9 light points (but the present disclosure is not limited to this), and each light point typically includes an LED with red, green, and blue. The mentioned identification code is, for example, a unique identification of the associated display screen, such as an SN code (Serial Number, product serial number). The mentioned initial position coordinate information includes, for example, an area number and a coordinate number. It should be noted that when the display screen is powered on for the first time, the initial position coordinate information is usually a default value, such as 00-000-000.

In step S12, the mentioned step of displaying plurality of display information is, for example, that the plurality of display information is displayed in a list manner, wherein the main console will display in a list manner, the received displayed plurality of display screen information on the user interface of the main console for users to browse.

Figure 2:
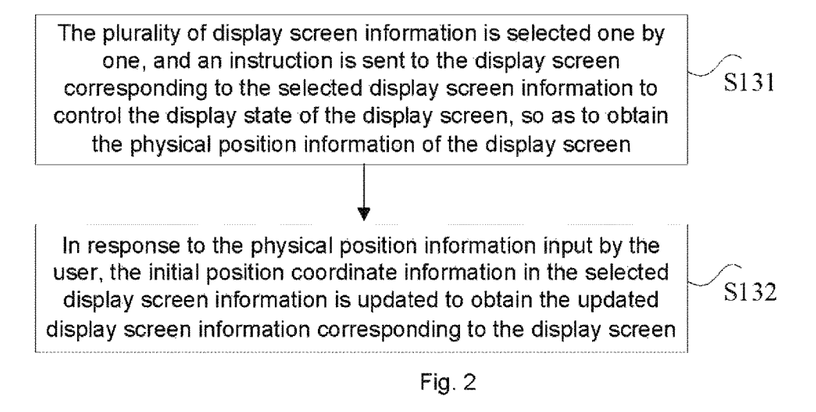
FIG. 2 is a flowchart of the step S13 in the method for configuring the display screen provided by the first embodiment of the preset disclosure.

In step S13, as shown in FIG. 2, it includes, for example, steps S131-S132:

Step S131: the plurality of display screen information is selected one by one, and an instruction is sent to the display screen corresponding to the selected display screen information to control the display state of the display screen, so as to obtain the physical position information of the display screen; and Step S132: in response to the physical position information input by the user, the initial position coordinate information in the selected display screen information is updated to obtain the updated display screen information corresponding to the display screen.

In step S131, an instruction is set to control the display state of the display screen, for example, the display screen is changed to full-on from full-off, or the brightness of the display screen is changed. It should be noted that this embodiment does not limit the specific change of the display state of the display screen as long as the user is able to distinguish the physical position of the corresponding display screen.

In step S14, the plurality of updated display screen information is ranked according to the target position coordinate information in the plurality of updated display screen information, for example: the areas of the plurality of updated display screen information is divided according to the area number in the target position coordinate information in the plurality of updated display screen information, and then the updated display screen information in the one area is ranked according to the coordinate number in the target position coordinate information.

In step S15, after ranking, display the coordinate assignments are performed on the plurality of updated display screen information, for example, in the list, the coordinate assignment is performed on the updated display screen information from left to right and from top to the bottom according to the coordinates of the upper left corner (0,0).

In step S16, the plurality of updated display screen information and the plurality of display coordinate information corresponding to the plurality of updated display screen information are sent to the plurality of display screens, for example, including: the updated display screen information and the display coordinate information corresponding to the updated display screen information are sent one by one according to the identification codes in the plurality of updated display screen information.

Figure 3:
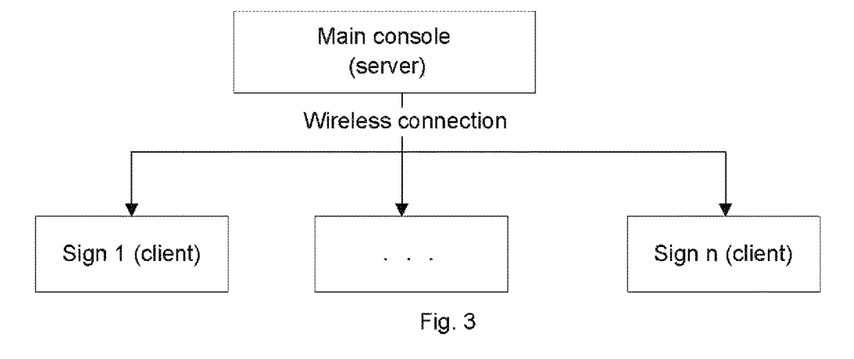
FIG. 3 is a system architecture diagram involved in the method for configuring the display screen provided by the first embodiment, of the preset disclosure.
Figure 4:
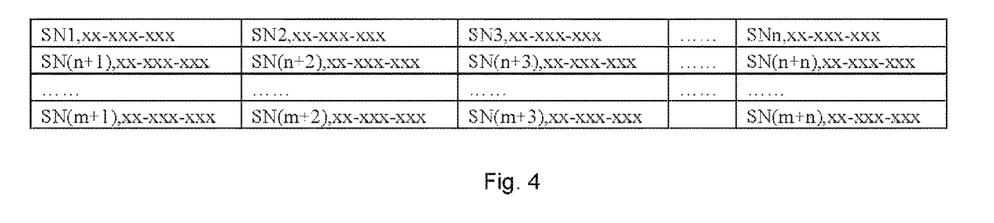
FIG. 4 is a schematic diagram of ranking the target position coordinate information involved in the method for configuring the display screen provided by the first embodiment of the preset disclosure.

The method for configuring the display screen provided by the first embodiment of the preset disclosure is described in details with reference to FIG. 3 and FIG. 4.

The setting situation is: at the opening scene of a concert, a sign is placed on each seat, namely, the display screen mentioned above, which serves as a display element of the large screen of the whole seats. The mentioned sign is, for example, a control card and an LED display screen body connecting to the control card. The method for configuring the display screen provided in this embodiment is configured to configure the sign on each seat in the opening scene.

As shown in FIG. 3, the interaction mode similar to the server and the client is adopted between the main console and the sign (display screen), wherein the main console is the server, and the sign is the client. The main console is connected with the plurality of signs through a wireless network, for example, the networking mode is Lora (Long Range), WiFi (Wireless Fidelity), 4G (4 Generation) and NB-IOT (Narrowband-Internet of Thing), and the following describes the networking mode of the Lora module as an example.

When the sign and the main console are matched and connected for the first time, the sign on the auditorium may be powered on in areas. Of course, when the number of signs on the auditorium is not enough, all signs on the auditorium may also be powered on uniformly. It should be noted that whether the signs are powered on in areas or all signs are powered on uniformly, as long as the main console is able to receive the connection request commands of all signs is ensured.

For the sign used for the first time, the sign will undergo a self-check after power-on, for example, the sign will flash for 3 times and then black out to indicate that the sign is operating normally. Then the sign will actively send a connection request to the main console through the Lora module. The content of the connection request information includes the sign information (display screen information), for example, the identification code of the control card in the sign, such as the SN number and the corresponding initial position coordinate information, and the initial position coordinate information of the sign used for the first time is, for example, a default value, such as 00-000-000.

When receiving the connection requests from a plurality of signs, the main console will display the sign information of the plurality of received signs in a list manner, such as the SN number and initial position coordinate information. Then the user arbitrarily selects one piece of the sign information on the user interface of the main console, the main console will send a control instruction to the corresponding sign according to the SN number in the selected sign information to control the display state of the corresponding sign, for example, the corresponding sign will be changed to full-on from full-off. At this time, the installer may input the actual position information as "xx-xxx-xxx" in the user interface of the main console according to the actual position information (physical position information) of the light sign to update the initial position coordinate information of the sign and obtain the target position coordinate information. Next, in the same way, the main console may search all signs, and may update the initial position coordinate information of all signs.

After the initial position coordinate information of all signs is updated, all signs are ranked by the plurality of obtained target position coordinate information, for example, the ranking order refers to the area number, and then the signs are ranked in each area according to the coordinate number. As shown in FIG. 4, after all signs are ranked according to the target position coordinate information, then in the table as shown in FIG. 4, the display coordinate is given to each sign information from left to right and from top to bottom according to the coordinates of the sign information at the upper left corner as (0,0), after all sign information is assigned to the display coordinates, the target position coordinate information and the display coordinates are respectively solidified into each control card. As at least one alternative embodiment, the main console sends the corresponding display coordinates and the target position coordinate information to the corresponding sign according to the SN number. In this way, it can ensure that each sign can receive the corresponding display coordinates and the target position coordinate information. Then, various separately arranged display screens in the seat display screen may be controlled to play text, pictures and videos according to the existing mature control method.

In addition, it should be noted that the control cards corresponding to the plurality of signs may send their own SN number and position coordinate information to main console after the first configuration of the plurality of signs is completed and when the signs are powered on for the second time. The main console ranks according to the position coordinate information to complete the virtual splicing of the whole seat display screen.

It should be noted that when the control card corresponding to the sign is powered on and after the control card detects that its position coordinate information has been configured, it will play normally according to the pre-stored program content. When the program content needs to be replaced, the program content is merely sent to each sign on the main console.

The same program content is sent to each sign, and then each sign will intercept the part that needs to be displayed in the program content according to its corresponding display coordinates and display the content, and the display principle is the same as that of the existing mature receiving card, so it will not be repeated here.

In conclusion, the method for configuring the display screen proposed by the first embodiment of the preset disclosure provides a method for connecting a plurality of display screens in a wireless manner for configuration, the preset disclosure field of the display screen is expanded, and the operation is more convenient, a plurality of display screens can be configured simultaneously, the efficiency for configuring the plurality of display screens is improved; the existing difficulty of connecting a plurality of display screens in a wired manner for configuration and erection is avoided, the presence of many wires in the auditorium is avoided, which is inconvenient for the audience to move around, the influence of the wire on the audience is reduced; and the real-time interaction between the live stage and the auditorium is realized, and the performance effect is enhanced.

Embodiment 2

Figure 5:
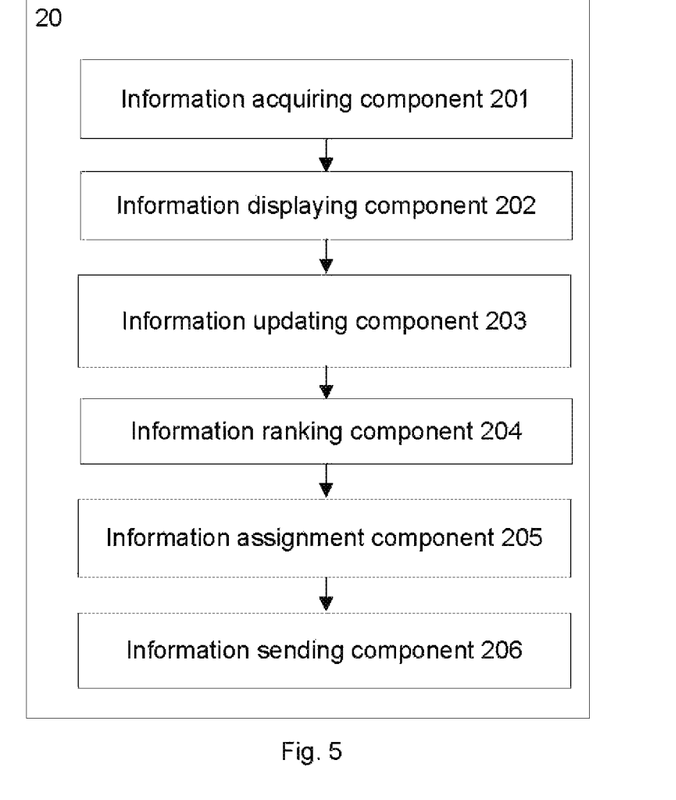
FIG. 5 is a schematic diagram of the component of the device for configuring the display screen provided by the second embodiment of the preset disclosure.

Referring to FIG. 5, the second embodiment of the preset disclosure proposes a configuration device for a display screen. As shown in FIG. 5, the device 20 for configuring the display screen includes, for example, an information acquiring component 201, an information displaying component 202, an information updating component 203, an information ranking component 204, a information assignment component 205, and an information sending component 206.

The information acquiring component 201 is configured to acquire a plurality of display screen information corresponding to a plurality of display screens, wherein each of the plurality of the display screen information includes an identification code and the initial position coordinate information. The information displaying component 202 is configured to display the plurality of display screen information. The information updating component 203 is configured to update the initial position coordinate information in the displayed plurality of display screen information to obtain the plurality of updated display screen information corresponding to the plurality of display screens, wherein each of the plurality of updated display screen information includes the identification code and the target position coordinate information corresponding to the identification code. The information ranking component 204 is configured to rank the plurality of updated display screen information according to the target position coordinate information in the plurality of updated display screen information. The information assignment component 205 is configured to perform respectively display coordinate assignments on the plurality of updated display screen information after ranking, so as to obtain the plurality of display coordinate information corresponding, to the plurality of updated display screen information. The information sending component 206 is configured to send the plurality of updated display screen information and the plurality display coordinate information corresponding to the plurality of updated display screen information to the plurality of display screens.

As at least one alternative embodiment, the information displaying component 202 is configured to display the plurality of display screen information in a list manner.

Figure 6:
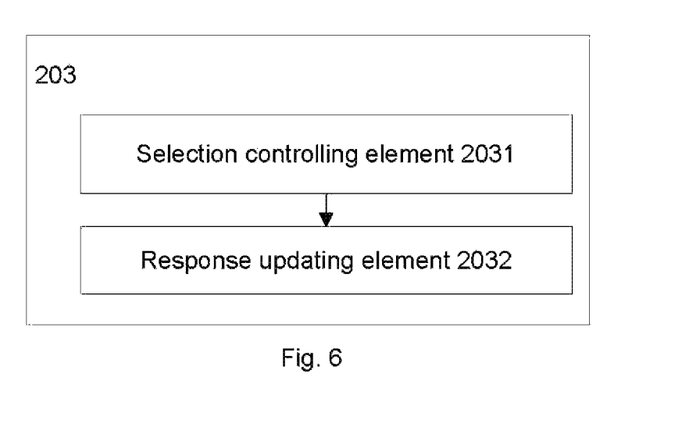
FIG. 6 is a schematic diagram of the element of the information updating component 203 in the device for configuring the display screen provided by the second embodiment of the preset disclosure.

As at least one alternative embodiment, as shown in FIG. 6, the information updating component 203 includes a selection controlling element 2031 and a response updating element 2032.

The selection controlling element 2031 is configured to select the plurality of display screen information one by one, and send an instruction to the display screen corresponding to the selected display screen information to control the display state of the display screen, so as to obtain the physical position information of the display screen, the response updating element is configured to, in response to the physical position information input by the user, update the initial position coordinate information in the selected display screen information to obtain the updated display screen information corresponding to the display screen.

As at least one alternative embodiment, the information sending component 206 is configured to send one by one the updated display screen information and the display coordinate information corresponding to the updated display screen information according to the identification codes in the plurality of updated display screen information.

The method for configuring the display screen realized by the above configuration device for the display screen in the second embodiment of the preset disclosure is as described in the foregoing first embodiment, so it will not be described in detail here. As an alternative embodiment, each component, element, and other operations or functions in the second embodiment are used for realizing the method in the first embodiment of the preset disclosure, and not repeated here for brevity.

In conclusion, the device for configuring the display screen proposed by the second embodiment of the preset disclosure provides a method for connecting a plurality of display screens in a wireless manner for configuration, the preset disclosure field of the display screen is expanded, and the operation is more convenient, a plurality of display screens can be configured simultaneously, the efficiency for configuring the plurality of display screens is improved; the existing difficulty of connecting a plurality of display screens in a wired manner for configuration and erection is avoided, the presence of many wires in the auditorium is avoided, which is inconvenient for the audience to move around, the influence of the wire on the audience is reduced; and the real-time interaction between the live stage and the auditorium is realized, and the performance effect is enhanced.

Embodiment 3

Figure 7:
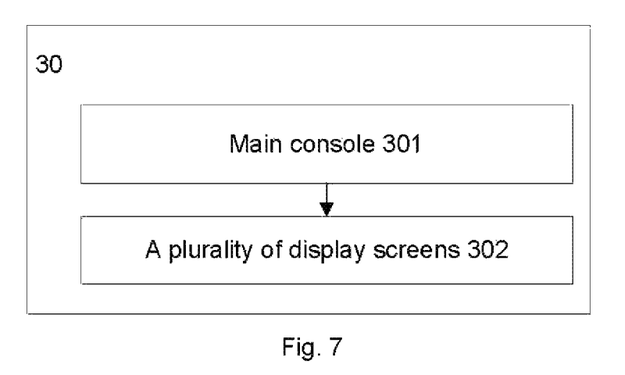
FIG. 7 is a schematic diagram of the structure of the system for configuring the display screen provided by the third embodiment of the preset disclosure.

Referring to FIG. 7, the third embodiment of the preset disclosure proposes a system for configuring a display screen. The system 30 for configuring the display screen includes, for example, a main console 301 and a plurality of display screens 302 respectively connecting to the main console 301.

The mentioned display screen 302 includes, for example, a control card and an LED display screen body connecting to the control card, wherein the control card is assembled with the LED display screen body, the LED display screen body includes, for example, 9 light points (the present disclosure is not limited to this), and each light point is an RGB three-color LED.

The main console 301 is configured to: acquire a plurality of display screen information corresponding to a plurality of display screens in a wireless manner, wherein each of the plurality of the display screen information includes an identification code and the initial position coordinate information; display the plurality of display screen information; update the initial position coordinate information in the displayed plurality of display screen information to obtain the plurality of updated display screen information corresponding to the plurality of display screens, wherein each of the plurality of updated display screen information includes the identification code and the target position coordinate information corresponding to the identification code; rank the plurality of updated display screen information according to the target position coordinate information in the plurality of updated display screen information; perform display coordinate assignments on the plurality of updated display screen information after ranking, so as to obtain the plurality of display coordinate information corresponding to the plurality of updated display screen information, and send the plurality of updated display screen information and the plurality of display coordinate information corresponding to the plurality of updated display screen information to the plurality of display screens.

In view of the above, the main console 301 realizes the method for configuring the display screen provided in the first embodiment. For the example introduction of the method for configuring the display screen adopted by the main console, please refer to the first embodiment. The introduction of the internal component division of the main console 301 may refer to the second embodiment, and the method and the device for configuring the display screen will not be introduced repeatedly in the third embodiment of the preset disclosure. The main console 301 may be a personal computer, a server, a handheld device or a portable device, a tablet device, a multi-processor system, a microprocessor-based system, an editable consumer electronic device, a network PC, a small computer, a large computer and distributed computing environment including any of the above systems or devices, etc.

In conclusion, the system for configuring the display screen proposed by the third embodiment of the preset disclosure provides a method for connecting a plurality of display screens in a wireless manner for configuration, the preset disclosure field of the display screen is expanded, and the operation is more convenient, a plurality of display screens can be configured simultaneously, the efficiency for configuring the plurality of display screens is improved; the existing difficulty of connecting a plurality of display screens in a wired manner for configuration and erection is avoided, the presence of many wires in the auditorium is avoided, which is inconvenient for the audience to move around, the influence of the wire on the audience is reduced; and the real-time interaction between the live stage and the auditorium is realized, and the performance effect is enhanced.

Embodiment 4

Figure 8:
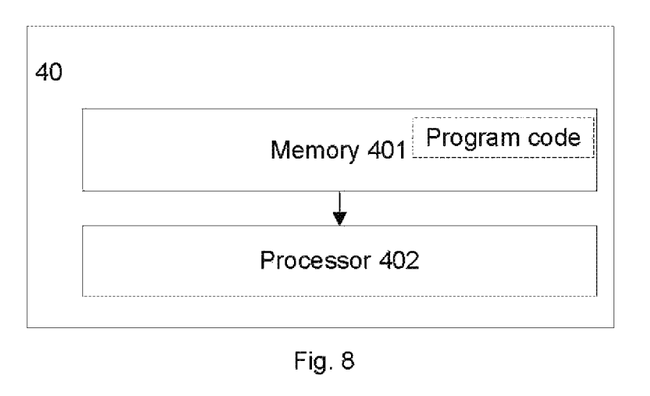
FIG. 8 is a schematic diagram of the structure of the system for configuring the display screen provided by the fourth embodiment of the preset disclosure.

Referring to FIG. 8, the fourth embodiment of the preset disclosure proposes a system for configuring a display screen. The configuration system 40 for the display screen includes, for example, a memory 401 and at least one processor 402 connecting to the memory 401, wherein the memory 401 stores a computer program, and the at least one processor 402 is configured to execute the computer program to realize the method for configuring the display screen described in the foregoing first embodiment. For example, when the computer program is executed by the at least one processor 402, the following steps are performed:

(a) the plurality of display screen information corresponding to the plurality of display screens is acquired, wherein each of the display screen information includes an identification code and initial position coordinate information;

(b) the plurality of display screen information is displayed;

(c) the initial position coordinate information in the displayed plurality of display screen information is updated to obtain the plurality of updated display screen information corresponding to the plurality of display screens, wherein each of the updated display screen information includes the identification code and the target position coordinate information corresponding to the identification code;

(d) the plurality of updated display screen information is ranked according to the target position coordinate information in the plurality of updated display screen information;

(e) Display the coordinate assignments are performed on the plurality of updated display screen information after ranking respectively, so as to obtain the plurality of display coordinate information corresponding to the plurality of updated display screen information; and (f) the plurality of updated display screen information and the plurality display coordinate information corresponding to the plurality of updated display screen information are sent to the plurality of display screens.

The method for configuring the display screen realized, by the computer program of the system 40 for configuring the display screen provided in this embodiment is as described in the foregoing first embodiment, so it will not be described in detail here. As at least one alternative embodiment, each processor and memory in this embodiment respectively realizes the method in the first embodiment of the preset disclosure. For brevity, it will not be repeated here. The technical effect of the system 40 for configuring the display screen provided by the fourth embodiment of the preset disclosure is the same as that of the method for configuring the display screen in the first embodiment, and it will not be repeated here.

Embodiment 5

Figure 9:
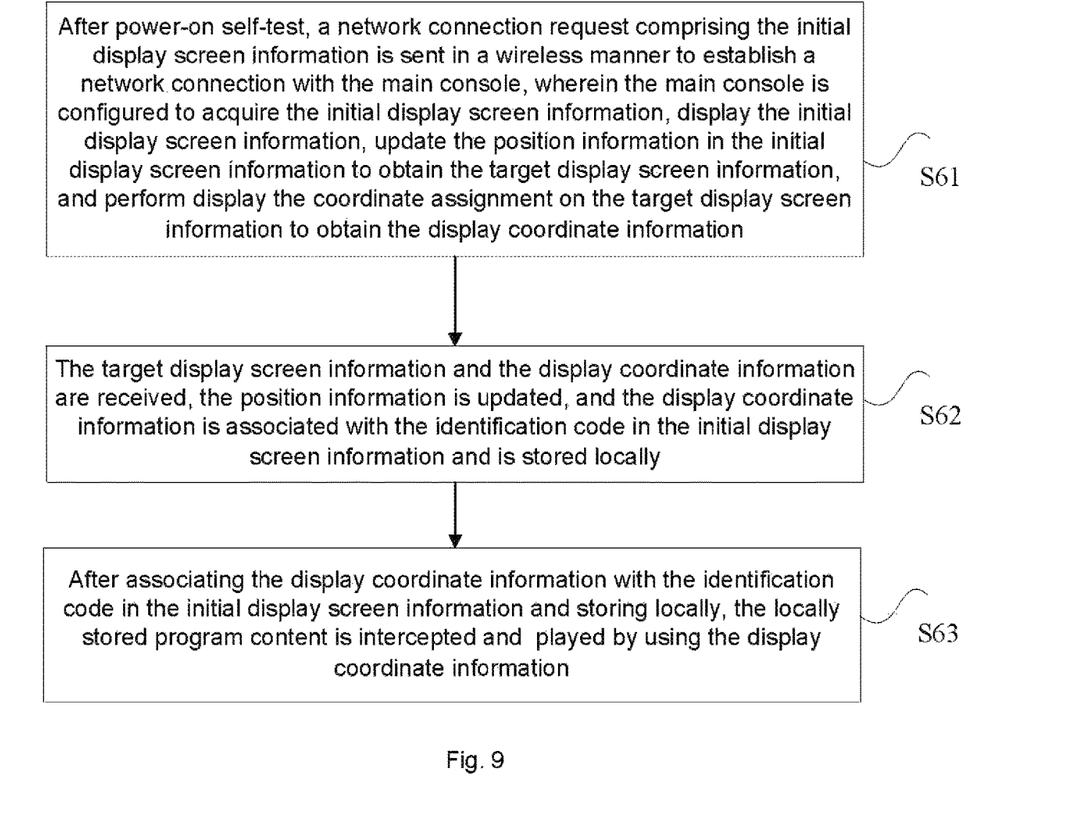
FIG. 9 is a flowchart of the method for configuring the display screen provided by the fifth embodiment of the preset disclosure.

Referring to FIG. 9, the fifth embodiment of the preset disclosure proposes a method for configuring a display screen. As shown in FIG. 9, the method for configuring the display screen proposed in the fifth embodiment of the preset disclosure includes, for example, steps S61-S62:

Step S61: after power-on self-test, a network connection request including the initial display screen information is sent in a wireless manner to establish a network connection with the main console, wherein main console is configured to acquire the initial display screen information, display the initial display screen information, update the position information in the initial display screen information to obtain the target display screen information, and perform display coordinate assignment on the target display screen information to obtain the display coordinate information; and Step S62: the target display screen information and the display coordinate information are received, the position information is updated, and the display coordinate information is associated with the identification code in the initial display screen information and storing locally.

As at least one alternative embodiment, the method for configuring the display screen proposed in the fifth embodiment of the preset disclosure further includes:

Step S63: after associating the display coordinate information with the identification code in the initial display screen information and storing locally, the locally stored program content is intercepted and played by using the display coordinate information.

In step S61, the display screen is subjected to power-on self-test when not being configured. For example, the display screen flashes three times and then goes black after being powered on, indicating that the control card of the display screen is able to operate normally. The control card of the display screen is equipped with a wireless communication component, which is able to make the control card automatically send a network connection request including the initial display screen information to the main console. The mentioned wireless communication component is, for example, one of Lora module, WiFi module, 4G module and NB-IOT module. The mentioned initial display screen information includes, for example, the SN number of the display screen control card and the initial position coordinate information of the display screen.

In step S62, after the control card of the display screen receives the target display screen information and the display coordinate information, the original position information will be updated, and the display coordinate information and the identification code in the initial display screen information are associated and stored in the memory connecting to the control card.

In addition, it is worth mentioning that the difference between the method for configuring the display screen proposed in the fifth embodiment of the present disclosure and the method for configuring the display screen proposed in the first embodiment of the present disclosure is that the method for configuring the display screen proposed in the first embodiment of the present disclosure is explained from the perspective of the main console, while the method for configuring the display screen proposed in the fifth embodiment of the present disclosure is explained from the perspective of the display screen, but the principle is the same. Therefore, for a detailed description of the steps of the method for configuring the display screen proposed in the fifth embodiment of the preset disclosure, please refer to the corresponding content of the first embodiment. For brevity, it will not be repeated here.

In conclusion, the method for configuring the display screen proposed by the fifth embodiment of the preset disclosure provides a method for connecting a plurality of display screens in a wireless manner for configuration, the preset disclosure field of the display screen is expanded, and the operation is more convenient, a plurality of display screens can be configured simultaneously, the efficiency for configuring the plurality of display screens is improved; the existing difficulty of connecting a plurality of display screens in a wired manner for configuration and erection is avoided, the presence of many wires in the auditorium is avoided, which is inconvenient for the audience to move around, the influence of the wire on the audience is reduced; and the real-time interaction between the live stage and the auditorium is realized, and the performance effect is enhanced.

Embodiment 6

Figure 10:
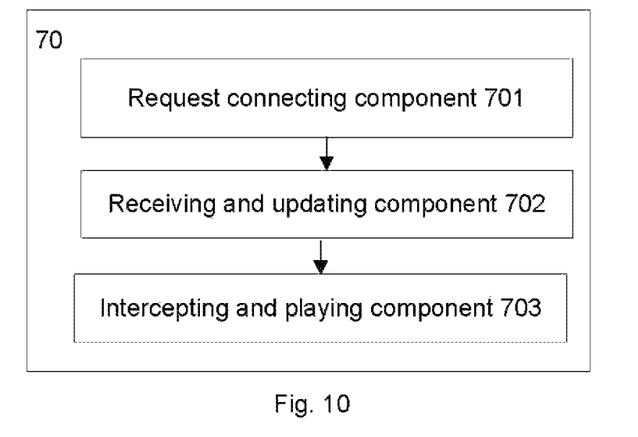
FIG. 10 is a schematic diagram of the component of the device for configuring the display screen provided by the sixth embodiment of the preset disclosure.

Referring to FIG. 10, the sixth embodiment of the preset disclosure proposes a device for configuring a display screen. The device 70 for configuring the display screen includes, for example, a request connecting component 701 and a receiving and updating component 702.

The request connecting component 701 is configured to: send a network connection request including the initial display screen information in a wireless manner to establish a network connection with the main console after power-on self-test, wherein the main console is configured to acquire the initial display screen information, display the initial display screen information, update the position information in the initial display screen information to obtain the target display screen information, and perform display coordinate assignment on the target display screen information to obtain the display coordinate information by the main console. The receiving and updating component 702 is configured to: receive the target display screen information and the display coordinate information, update the position information, and associate the display coordinate information with the identification code in the initial display screen information and store locally.

As at least one alternative embodiment, the device 70 for configuring the display screen further includes: an intercepting and playing component 703, which is configured to intercept and play locally stored program content by using the display coordinate information after associating the display coordinate information with the identification code in the initial display screen information and storing locally.

The method for configuring the display screen realized by the device 70 for configuring the display screen in the sixth embodiment of the preset disclosure is as described in the foregoing fifth embodiment, so it will not be described in detail here. For example, each component, element, and other operations or functions in the sixth embodiment are used for realizing the method in the fifth embodiment of the preset disclosure, and for brevity, it will not be repeated here.

In conclusion, the device for configuring the display screen proposed by the sixth embodiment of the preset disclosure provides a configuration method for connecting a plurality of display screens in a wireless manner for configuration, the preset disclosure field of the display screen is expanded, and the operation is more convenient, a plurality of display screens can be configured simultaneously, the efficiency for configuring the plurality of display screens is improved; the existing difficulty of connecting a plurality of display screens in a wired manner for configuration and erection is avoided, the presence of many wires in the auditorium is avoided, which is inconvenient for the audience to move around, the influence of the wire on the audience is reduced; and the real-time interaction between the live stage and the auditorium is realized, and the performance effect is enhanced.

Embodiment 7

Figure 11:
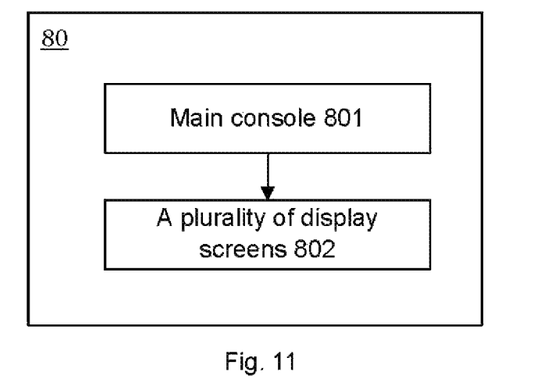
FIG. 11 is a schematic diagram of the structure of the system for configuring the display screen provided by the seventh embodiment of the preset disclosure.

Referring to FIG. 11, the seventh embodiment of the preset disclosure proposes a system for configuring a display screen. The system 80 for configuring the display screen includes, for example, a main console 801 and a plurality of display screens 802 respectively connecting to the main console 301.

The main console 801 may be a personal computer, a server, a handheld device or a portable device, a tablet device, a multi-processor system, a microprocessor-based system, an editable consumer electronic device, a network PC, a small computer, a large computer and distributed computing environment including any of the above systems or devices, etc., which are configured to configure the plurality of display screens in wireless communication.

The display screen 802 includes, for example, a control card and an LED display screen body (for example, including one or a plurality of LED light panels) connecting to the control card, wherein the control card is assembled with the LED display screen body. The LED display screen body includes, for example, 9 light points (the present disclosure is not limited to this), and each light point is an RGB three-color LED. For example, the display screen 802 is configured to: send a network connection request including the display screen information in a wireless manner after power-on self-test to establish a network connection with the main console, wherein the main console is configured to acquire the display screen information, display the display screen information, update the position information in the display screen information to obtain the target display screen information and perform display coordinate assignment on the target display screen information to obtain the display coordinate information by the main console; receive the target display screen information and the display coordinate information, update the position information, associate the display coordinate information with the identification code in the display screen information and store locally; and intercept and play the locally stored program content by using the display coordinate information after associating the display coordinate information with the identification code in the display screen information and storing locally.

In view of the above, the display screen 802 realizes the method for configuring the display screen provided in the fifth embodiment. For the specific introduction of the method for configuring the display screen adopted by the display screen 802, please refer to the fifth embodiment. The introduction of the internal component division of the display screen 802 may refer to the sixth embodiment, and the configuration method and the device for configuring the display screen will not be introduced repeatedly in the seventh embodiment of the preset disclosure.

In conclusion, the system for configuring the display screen proposed by the seventh embodiment of the preset disclosure provides a method for connecting a plurality of display screens in a wireless manner for configuration, the preset disclosure field of the display screen is expanded, and the operation is more convenient, a plurality of display screens can be configured simultaneously, the efficiency for configuring the plurality of display screens is improved; the existing difficulty of connecting a plurality of display screens in a wired manner for configuration and erection is avoided, the presence of many wires in the auditorium is avoided, which is inconvenient for the audience to move around, the influence of the wire on the audience is reduced; and the real-time interaction between the live stage and the auditorium is realized, and the performance effect is enhanced.

Embodiment 8

Figure 12:
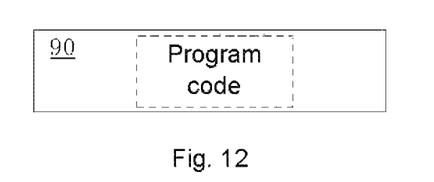
FIG. 12 is a schematic diagram of the structure of the computer readable medium provided by the eighth embodiment of the preset disclosure.

Referring to FIG. 12, the eighth embodiment of the preset disclosure provides a computer readable medium. As shown in FIG. 12, the computer readable medium 90 stores a program code, and the program code includes the instruction for executing the method for configuring the display screen described in the first embodiment. For example, when the instruction is executed by one or a plurality of processors, the following operations are performed;

(a) the plurality of display screen information corresponding to the plurality of display screens is acquired, wherein each of the plurality of the display a screen information includes an identification code and initial position coordinate information;

(b) the plurality of display screen information is displayed;

(c) the initial position coordinate information in the displayed plurality of display screen information is updated to obtain the plurality of updated display screen information corresponding to the plurality of display screens, wherein each of the plurality of updated display screen information includes the identification code and the target position coordinate information corresponding to the identification code;

(d) the plurality of updated display screen information is ranked according to the target position coordinate information in the plurality of updated display screen information;

(e) Display coordinate assignments are performed on the plurality of updated display screen information after ranking respectively, so as to obtain the plurality of display coordinate information corresponding, to the plurality of updated display screen information; and (f) the plurality of updated display screen information and the plurality display coordinate information corresponding to the plurality of updated display screen information are sent to the plurality of display screens.

For the computer readable medium 90 provided in this embodiment, the instruction contained in its program code may be executed by at least one processor to perform the method for configuring the display screen as described in the first embodiment, so it will not be repeated here. The technical effect of the computer readable medium 90 provided in this embodiment is basically the same as that of the method for configuring the display screen in the first embodiment, and it will not be repeated here.

From the above description of the embodiments, it can be known that those skilled in the art can clearly understand that the present disclosure can be implemented by means of software plus a necessary general hardware platform. Based on this understanding, the essence of the technical solution of the present disclosure or the contribution to the prior art can be embodied in the form of a software product, and the computer software product can be stored in a storage medium, such as ROM/RAM, optical disk and magnetic disks, etc., including a plurality of instructions to make a computer device (which may be a personal computer, a server, or a network device, etc.) execute the various embodiments of the preset disclosure or the methods of certain parts of the embodiments.

Obviously, those skilled in the art should understand that the above components or method steps of the preset disclosure can be implemented by a general computing device, and they can be concentrated on a single computing device or distributed on the network composed of a plurality of computing devices. Optionally, they can be implemented by executable program codes of the computing device, so that they can be stored in a storage device to be executed by the computing device, or they can be made into individual integrated circuit components, or the plurality of components or steps are made into a single integrated circuit component. Thus, the present disclosure is not limited to any specific hardware and software combination.

The above are only the preferred embodiments of the preset disclosure and not intended to limit the preset disclosure. For those skilled in the art, various modifications and changes can be made to the preset disclosure. Any modification, equivalent substitution and improvement made within the spirit and principle of the preset disclosure are intended to be included within the scope of protection of the preset disclosure.

What is claimed is:

1. A method for configuring a display screen, comprising:
acquiring a plurality of display screen information corresponding to a plurality of display screens, wherein each of the plurality of display screen information comprises an identification code and initial position coordinate information, and the plurality of display screens are display screens on an auditorium;
displaying the plurality of display screen information;
updating the initial position coordinate information in the displayed plurality of display screen information to obtain a plurality of updated display screen information corresponding to the plurality of display screens, wherein each of the plurality of updated display screen information comprises the identification code and target position coordinate information corresponding to the identification code;
ranking the plurality of updated display screen information according to the target position coordinate information in the plurality of updated display screen information;
respectively performing display coordinate assignments on the plurality of updated display screen information after ranking, so as to obtain a plurality of display coordinate information corresponding to the plurality of updated display screen information;
and sending in a wireless manner the plurality of updated display screen information and the plurality of display coordinate information corresponding to the plurality of updated display screen information to the plurality of display screens;
wherein the updating the initial position coordinate information in the displayed plurality of display screen information to obtain the plurality of updated display screen information corresponding to the plurality of display screens comprises:
selecting the plurality of display screen information one by one, and sending an instruction to a display screen corresponding to a selected display screen information to control a display state of the display screen, so as to obtain physical position information of the display screen;
and in response to the physical position information input by a user, updating initial position coordinate information in the selected display screen information to obtain the updated display screen information corresponding to the display screen.

2. The method as claimed in claim 1, wherein the displaying the plurality of display screen information comprises:
displaying the plurality of display screen information in a list manner.

3. The method as claimed in claim 1, wherein the sending the plurality of updated display screen information and the plurality of display coordinate information corresponding to the plurality of updated display screen information to the plurality of display screens comprises:
sending one by one, the updated display screen information and the display coordinate information corresponding to the updated display screen information according to identification codes in the plurality of updated display screen information.

4. A system for configuring a display screen, comprising:
a plurality of display screens;
a main console, configured to:
acquire a plurality of display screen information corresponding to the plurality of display screens in a wireless manner, wherein each of the plurality of display screen information comprises an identification code and initial position coordinate information, and the plurality of display screens are display screens on an auditorium;
display the plurality of display screen information;
update the initial position coordinate information in the displayed plurality of display screen information to obtain a plurality of updated display screen information corresponding to the plurality of display screens, wherein each of the plurality of updated display screen information comprises the identification code and target position coordinate information corresponding to the identification code;
rank the plurality of updated display screen information according to the target position coordinate information in the plurality of updated display screen information;
respectively perform display coordinate assignments on the plurality of updated display screen information after ranking, so as to obtain a plurality of display coordinate information corresponding to the plurality of updated display screen information;

and send the plurality of updated display screen information and the plurality of display coordinate information corresponding to the plurality of updated display screen information to the plurality of display screens;

wherein the main console is configured to:

select the plurality of display screen information one by one, and send an instruction to a display screen corresponding to a selected display screen information to control a display state of the display screen, so as to obtain a physical position information of the display screen;

in response to the physical position information input by a user, update initial position coordinate information in the selected display screen information to obtain the updated display screen information corresponding to the display screen.

5. The system as claimed in claim 4, wherein the main console is configured to display the plurality of display screen information in a list manner.

6. The system as claimed in claim 4, wherein the main console is configured to send one by one, the updated display screen information and the display coordinate information corresponding to the updated display screen information according to identification codes in the plurality of updated display screen information.

7. A system for configuring a display screen, comprising at least one processor and a computer readable storage, coupled to the at least one processor and storing at least one computer executable instruction thereon, which when the at least one computer executable instruction is executed by the at least one processor, causes the at least one processor to carry out following actions:

acquiring a plurality of display screen information corresponding to a plurality of display screens, wherein each of the plurality of display screen information comprises an identification code and initial position coordinate information, and the plurality of display screens are display screens on an auditorium;

displaying the plurality of display screen information;

updating the initial position coordinate information in the displayed plurality of display screen information to obtain a plurality of updated display screen information corresponding to the plurality of display screens, wherein each of the plurality of updated display screen information comprises the identification code and target position coordinate information corresponding to the identification code;

ranking the plurality of updated display screen information according to the target position coordinate information in the plurality of updated display screen information;

respectively performing display coordinate assignments on the plurality of updated display screen information after ranking, so as to obtain a plurality of display coordinate information corresponding to the plurality of updated display screen information;

and sending in a wireless manner the plurality of updated display screen information and the plurality of display coordinate information corresponding to the plurality of updated display screen information to the plurality of display screens;

wherein the updating the initial position coordinate information in the displayed plurality of display screen information to obtain the plurality of updated display screen information corresponding to the plurality of display screens comprises:

selecting the plurality of display screen information one by one, and sending an instruction to a display screen corresponding to a selected display screen information to control a display state of the display screen, so as to obtain physical position information of the display screen;

and in response to the physical position information input by a user, updating initial position coordinate information in the selected display screen information to obtain the updated display screen information corresponding to the display screen.

8. The system as claimed in claim 7, wherein the displaying the plurality of display screen information comprises:

displaying the plurality of display screen information in a list manner.

9. The system as claimed in claim 7, wherein the sending the plurality of updated display screen information and the plurality of display coordinate information corresponding to the plurality of updated display screen information to the plurality of display screens comprises:

sending one by one, the updated display screen information and the display coordinate information corresponding to the updated display screen information according to identification codes in the plurality of updated display screen information.

* * * * *